D. O'Flanagan,
Fruit Strainer,
N° 34,520.        Patented Feb. 25, 1862.
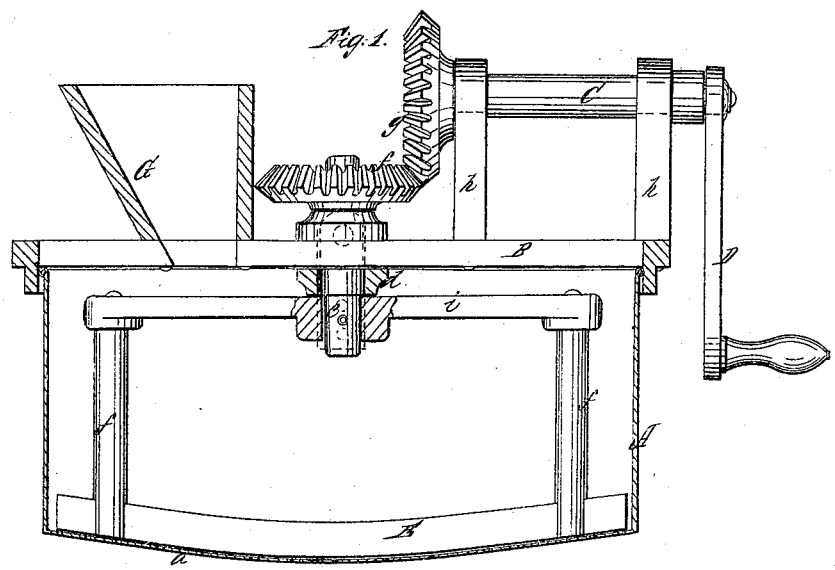
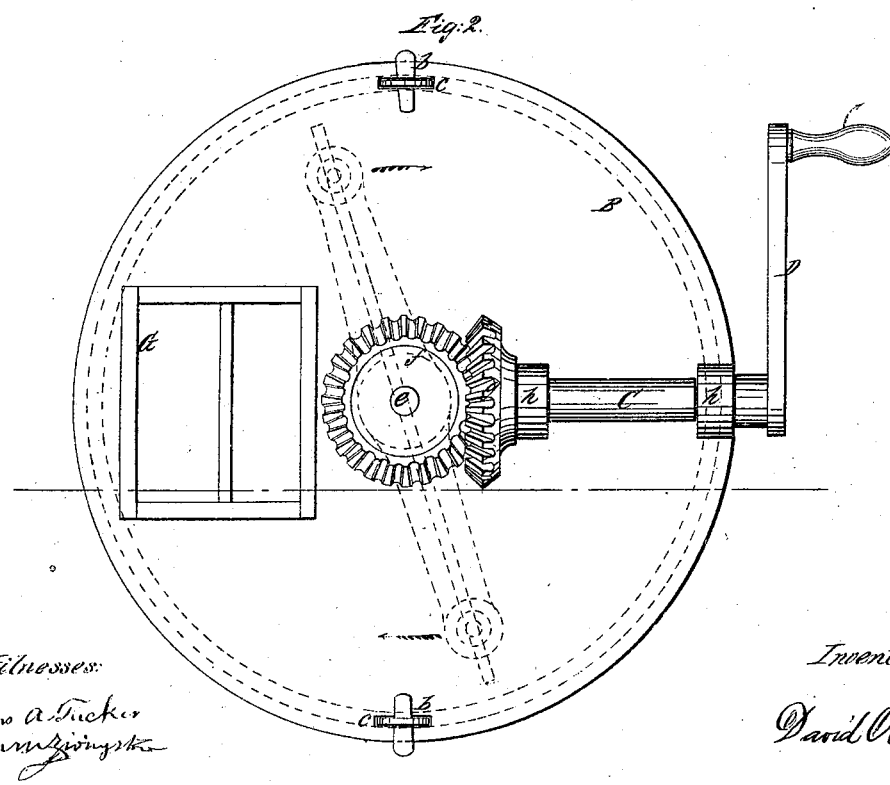
Witnesses:
Inventor:
David O'Flanagan

UNITED STATES PATENT OFFICE.

DAVID O'FLANAGAN, OF CHARLESTOWN, MASSACHUSETTS.

IMPROVED FRUIT-STRAINER.

Specification forming part of Letters Patent No. 34,520, dated February 25, 1862.

*To all whom it may concern:*

Be it known that I, DAVID O'FLANAGAN, of Charlestown, in the county of Middlesex and State of Massachusetts, have invented a new and Improved Fruit-Strainer; and I do hereby declare that the following is a full, clear, and exact description of the same, reference being had to the annexed drawings, making a part of this specification, in which—

Figure 1 is a vertical central section of my invention; Fig. 2, a plan or top view of the same.

Similar letters of reference indicate corresponding parts in the two figures.

This invention relates to a new and useful device for straining fruit—such, for instance, as stewed apples, rhubarb, blackberries, currants, &c.—designed chiefly for the use of bakers and confectioners, and to supersede the tedious manual operation hitherto practiced to effect the purpose, a common sieve and stick being the implements employed.

The invention consists in the employment or use of a cylindrical box provided with a concave perforated bottom, which serves as a sieve or screen, and used in connection with a rotary stirrer having a curved blade corresponding in form to the curvature of the bottom or sieve, all being arranged as hereinafter shown and described to effect the desired end.

To enable those skilled in the art to fully understand and construct my invention, I will proceed to describe it.

A represents a cylindrical box, which is provided with a flat top or cover B and a concave bottom $a$, which is perforated to form a screen or sieve, as shown in Fig. 1.

The top or cover B is removable, and may be secured on the box A by pins or keys $b$, which pass through ears or lugs $c$, that extend up through the cover B. In the cover B, at its center, there is fitted and secured a hub $d$, through which a vertical arbor $e$ passes, said arbor having a bevel-wheel $f$ on its upper part, into which a corresponding wheel $g$ on a horizontal shaft C gears. The shaft C is fitted in uprights $h\ h$ on the cover B and has a crank D on its outer end.

On the lower end of the arbor $e$ there is placed a bar $i$. This bar $i$ is nearly equal in length to the diameter of the box A. The bar $i$ is attached centrally to the arbor $e$, and it has a pendent bar $f$ secured to each end of it, said bars $f\ f$ extending down and just clearing the perforated bottom $a$ of the box A.

E is a curved bar of flat form, and is secured to the lower ends of the pendent bars $f\ f$. The bar E is curved to correspond to the curvature of the bottom $a$, the bar E just clearing the bottom $a$, as shown clearly in Fig. 1, and the ends of said bar extending nearly to the sides of the box A.

On the top or cover B there is placed a hopper G, through which the substance to be strained is passed into the box A.

The operation is as follows: The box A is fitted in any suitable receptacle, the edge of the cover B resting on the top edge of any suitable receptacle. The shaft C is then turned by hand, and the substance to be strained is passed in the hopper G and into the box A. The rotation of bar E, which is a stirrer, forces the fruit through the perforated bottom or sieve $a$, and the work is performed in a very expeditious and thorough manner.

The concave bottom $a$ facilitates the straining operation, as the substance operated upon has a tendency to be forced toward the center of the sieve, and gravity is made in a measure to counteract centrifugal force. The concave bottom $a$ of course involves the necessity of the bar or stirrer E being curved.

Having thus described my invention, what I claim as new, and desire to secure by Letters Patent, is—

The box A, provided with a concave perforated bottom $a$, in combination with the curved rotating bar or stirrer E when suspended from the cover B, and constructed, arranged, and operated, as and for the purpose herein set forth.

DAVID O'FLANAGAN.

Witnesses:
LEWIS A. TUCKER,
M. M. LIVINGSTON.